(12) United States Patent
Killough

(10) Patent No.: US 6,829,839 B2
(45) Date of Patent: Dec. 14, 2004

(54) ELECTRONIC CALIPER FOR MOUSE EAR AND RAT FOOT PAD EDEMA MEASUREMENT

(75) Inventor: Paul M. Killough, Chapel Hill, NC (US)

(73) Assignee: The United States of America as represented by the United States Environment Protection Agency, Washington, DC (US)

( * ) Notice: Subject to any disclaimer, the term of this patent is extended or adjusted under 35 U.S.C. 154(b) by 52 days.

(21) Appl. No.: 10/209,646

(22) Filed: Aug. 1, 2002

(65) Prior Publication Data
US 2004/0020069 A1 Feb. 5, 2004

(51) Int. Cl.[7] .................................................. G01B 5/06
(52) U.S. Cl. .......................................... 33/784; 33/511
(58) Field of Search ........................... 33/783, 784, 792, 33/793, 794, 797, 798, 799, 800, 801, 807, 808, 815, 511, 512

(56) References Cited
U.S. PATENT DOCUMENTS 2,785,471 A * 3/1957 Aldeborgh et al. ............ 33/800
4,233,743 A * 11/1980 Flick ............................. 33/512
4,397,092 A * 8/1983 Marcyan ........................ 33/797
5,430,954 A * 7/1995 Best et al. ..................... 33/793
5,454,175 A * 10/1995 Li ................................. 33/797

* cited by examiner

Primary Examiner—Christopher W. Fulton
(74) Attorney, Agent, or Firm—Lorusso, Loud & Kelly; George A. Loud

(57) ABSTRACT

An electronic caliper includes fixed and movable caliper arms mounted on a common housing and having jaws at their free ends. One of the caliper arms is attached to the housing through a pivot pin for pivoting motion between a contact position and a disengaged position. A spring engages the movable arm at a point on a side of the pivot pin opposite the jaws. The spring is under tension so as to bias the contact pad carried by the distal end of the movable caliper arm toward contact with the pad mounted on the distal end of the fixed caliper arm. A non-contact electronic sensor is positioned facing a target disk carried by movable caliper arm at its innermost end within the housing. A plunger, located on the same side of the pivot pin as is the target disk, allows the movable caliper arm to be pivoted to its open position to allow for insertion and removal of the soft tissue to be measured.

7 Claims, 1 Drawing Sheet

ELECTRONIC CALIPER FOR MOUSE EAR AND RAT FOOT PAD EDEMA MEASUREMENT

FIELD OF THE INVENTION

Electronic distance measuring technology is incorporated into a mechanical caliper for measuring thicknesses of soft biological tissues, thereby eliminating friction and inaccuracy inherent in a purely mechanical caliper and achieving adjustable and precisely repeatable contact forces where the caliper touches the tissues.

The Prior Art

A standard test for immune sensitivity is to inject a tiny amount of test material into the ear of a mouse. If, after a time, the ear becomes edematous, the test is considered positive. A similar test is done on rat foot-pads. The normal way to measure this edema has been to use an Oditest gauge, a European-made precision caliper with a dial face graduated in 100ths of a millimeter as shown in FIG. 1. This device was made for measuring hard materials such as metal, plastic, paper, etc., and works very well for such purposes. However, it applies a significant force, squeezing whatever it measures, which is not ideal for soft biological tissues because the squeezing action reduces the thickness and diminishes the resulting measurement.

A larger problem is that the squeezing force applied to the test tissue by the Oditest gauge is not consistent from measurement to measurement. An ideal gauge should apply the same force for every measurement at a given thickness. However, when the present inventors set up an Oditest gauge on a test stand, the Oditest did not do that. The force seemed to depend partly on how fast the operator released the actuator lever on the gauge. A faster release gave more force. But no matter how carefully the actuator lever was released, the Oditest gauge applied forces varying by as much as 30% from measurement to measurement.

Inside an Oditest gauge is a mechanical arrangement of pivots, gears, a spring, and a string wound around a spool. It is believed that friction between these parts is responsible for the force variations.

SUMMARY OF THE INVENTION

The present invention eliminates most of the internal mechanical parts of the Oditest gauge and substitutes therefor an electronic distance measuring device, thereby avoiding most of the friction believed to cause the problems described above in connection with the prior art device. Tests conducted by the present inventors show that, for a given measured distance, the device of the present invention applies precisely the same force every time the measurement is taken, by reason of use of a spring to provide the sole force pressing the caliper jaws against the biological tissue.

Accordingly, the present invention provides an electronic caliper for measuring the thickness of an object, e.g., the paw or ear of a laboratory animal, which electronic caliper includes a housing, a fixed caliper arm fixed to the housing and extending from the housing to a fixed free end external to the housing and providing a first jaw, and a movable caliper arm pivotally mounted on a pin fixed to the housing and extending from the pin to a movable free end also external to the housing and providing a second jaw facing the first jaw. A spring, mounted on or in the housing serves to bias the first and second jaws together with the object to be measured held therebetween. A non-contact electronic sensor is mounted in or on the housing to face the movable caliper arm for measuring the position of a point thereon with the jaws closed on the object to be measured. The electronic caliper further includes opening means for opening the jaws against the force of the spring.

In another aspect the present invention provides a method for measuring the extent of swelling in an ear, paw or other member of a laboratory test animal utilizing the electronic caliper described above. The method involves opening the jaws of the electronic caliper and placing the ear or paw between the open jaws. The jaws are then allowed to close on the ear or paw with the force pressing on that member limited to that provided by the spring alone. The degree of swelling of the ear is determined based on the measured position of the point on the movable caliper arm facing the non-contact electronic sensor.

DESCRIPTION OF THE PREFERRED EMBODIMENTS

Figure 1:
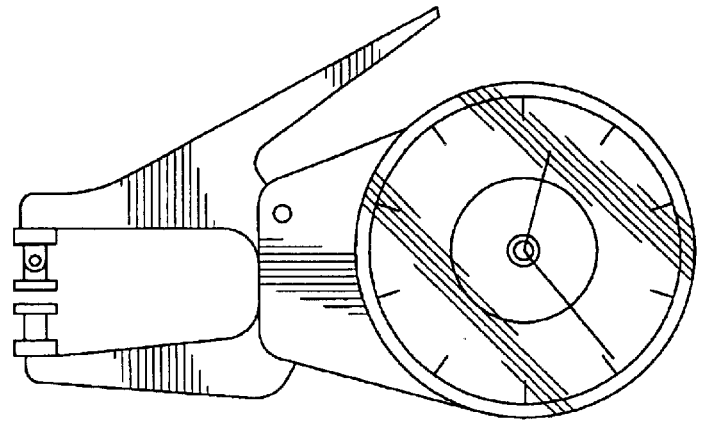
FIG. 1 is a schematic view of a prior art dial gauge conventionally used for determining the degree of swelling of a member of a laboratory test animal.
Figure 2:
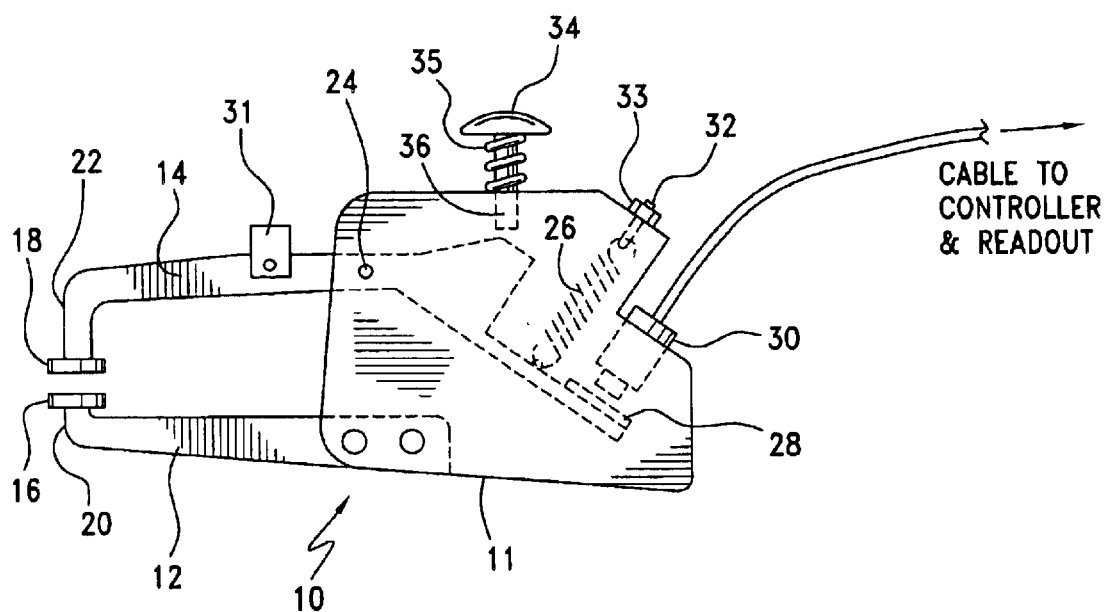
FIG. 2 is a schematic view of one embodiment of the apparatus of the present invention.

FIG. 2 shows a preferred embodiment of the electronic caliper of the present invention in the form of a mouse ear measuring device 10. Contact surface pads 16, 18 are attached to the free ends 20, 22 of caliper arms 12 and 14. Soft tissue to be measured is placed between these pads 16, 18.

The movable arm 14 is actually a lever mounted on a pivot pin 24 for pivoting motion, relative to the housing, between an engaged position in which the tissue to be measured is pressed between pads 16 and 18 and a disengaged position. The pivot pin 24 is supported by the housing through two sets of miniature sealed ball bearings (not shown). The ball bearings must be small enough to provide essentially friction-free operation, but be strong enough to withstand regular use. Attached to the movable arm 14 is a weight 31, a spring 26, and a "target" disk 28 for the electronic measuring module 30.

The weight 31 is positioned so that the movable arm 14 is exactly balanced about the pivot pin 24. Squeezing force on the tissue to be measured is applied solely by the spring 26 and not by gravity. The spring 26 may be adjusted by turning screw 32 which is threaded into a fitting 33 fixed to the housing 11. Thus, the spring 26 may be tightened or loosened. Further, a stronger or weaker spring can be easily substituted. In this manner, the caliper device 10 can be hand-held in any position and the squeezing force on the tissue to be measured will always remain constant at a given measured distance due to the fact that the spring 26 alone provides the totality of the squeezing force. A certain amount of squeezing force on the mouse ear or paw is needed because these appendages are not flat and have hair on their surfaces. Accordingly, sufficient force must be applied to flatten the appendage and any hair growing on it. Otherwise, an optical image could be measured directly. Somewhat similar considerations apply for the rat footpad.

Target disk 28, attached to the movable arm 22 serves as a target for the electronic distance measuring module 30. Such a module made by Keyence Corporation, which operates on the principle of induction, requires that the target disk 28 be made of steel. This module 30 manufactured by Keyence Corporation outputs a voltage of 0 to 2 volts equal to the distance from the module 30 to target 28 in millimeters. Module 30 is described by the vendor as accurate to within 1% of full scale and tests conducted by the present inventors have shown that it can have even a higher degree of accuracy if carefully calibrated. Other non-contact distance measuring devices can be suitably substituted for the induction unit marketed by Keyence. For example, devices operated on the principle of laser displacement would be suitable for this purpose.

For the mouse ear caliper, the sensing module 30 and its target disk 23 are positioned so that there is a 1:1 correspondence between the output voltage and the measurement in millimeters. For the rat foot-pad caliper, the module 30 and its target disk 23 are positioned so that there was a 1:5 correspondence between the output voltage and the measurement in millimeters. (See FIG. 2.) In this manner, the same measuring module 30 can be used in both calipers and the foot pad caliper can be made smaller. To get the measured distance in millimeters, the operator multiplies the displayed voltage by 5. Alternatively, an electronic circuit may be used to do this multiplication automatically. An electronic data logging output such as an RS-232 port may also be used.

Since the Keyence sensing module 30 has a rapid response and will pick up thickness changes due to the animal heart beat and other movements of the animal or the operator, a circuit was used to average the output voltage over approximately 1 second.

In order to open (spread) the caliper arms 12, 14, the operator presses down on button 34 whereby plunger 36 engages the movable caliper arm 14 at weight 30 to force contact pads 16–18 apart. When a measurement is to be made, the button 34 is released and plunger 36 disengages from weight 30 under the force of the spring 35.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed:

1. An electronic caliper for measuring the thickness of an object comprising:

a housing;

a fixed caliper arm fixed to said housing and extending from said housing to a fixed free end external to said housing, said fixed free end providing a first jaw;

a movable caliper arm pivotally mounted on a pin supported by said housing, said movable caliper arm being exactly balanced about said pin and extending from said pin to a movable free end external to said housing and providing a second jaw facing said first jaw;

a spring biasing said first and second jaws together with the object held therebetween, said spring being the sole force pressing the caliper jaws against the object;

a non-contact electronic sensor facing said movable caliper arm for measuring distance to a point on said movable caliper arm, with said jaws closed on the object, as a function of the thickness of the object; and opening means for opening said jaws against the force of said spring.

2. An electronic caliper according to claim 1 wherein said jaws are pads, respectively attached to the fixed free end and the movable free end.

3. An electronic caliper according to claim 1 wherein said opening means comprises a manually operable plunger positioned to contact and bear against movable arm on a side of said pin opposite said movable free end and spring means for biasing said plunger to a non-contact position spaced from said movable caliper arm.

4. A method for measuring extent of swelling in a member of a laboratory test animal, comprising:

opening the jaws of an electronic caliper according to claim 1;

placing the member between the open jaws;

allowing the jaws to close on the member, with the force pressing on the member limited to that provided by said spring alone;

determining the degree of swelling of the member based on the measured distance to said point on said movable caliper arm.

5. A method according to claim 4 wherein said member is an ear.

6. A method according to claim 4 wherein said member is a paw.

7. An electronic caliper according to claim 1 further comprising bearings through which said housing supports said pin, said bearings providing essentially friction-free operation.

\* \* \* \* \*